US012065977B2

(12) United States Patent
Burd

(10) Patent No.: US 12,065,977 B2
(45) Date of Patent: Aug. 20, 2024

(54) MULTI-DUCT EXHAUST SYSTEM FOR GAS TURBINE ENGINE

(71) Applicant: Raytheon Technologies Corporation, Farmington, CT (US)

(72) Inventor: Steven W. Burd, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/091,848

(22) Filed: Dec. 30, 2022

(65) Prior Publication Data

US 2024/0026829 A1 Jan. 25, 2024

Related U.S. Application Data

(60) Provisional application No. 63/391,496, filed on Jul. 22, 2022.

(51) Int. Cl.
*F02C 9/18* (2006.01)
*F23R 3/26* (2006.01)

(52) U.S. Cl.
CPC .............. *F02C 9/18* (2013.01); *F23R 3/26* (2013.01); *F05D 2220/323* (2013.01); *F05D 2260/606* (2013.01)

(58) Field of Classification Search
CPC .... F23R 3/26; F02C 9/18; F02K 1/825; F02K 1/625; F02K 1/62; F02K 1/60; F02K 1/58; F02K 1/56; F02K 1/563; F02K 1/566; F05D 2220/323; F05D 2260/606
See application file for complete search history.

(56) References Cited

U.S. PATENT DOCUMENTS

| 2,972,860 | A |   | 2/1961 | Moy |
| 3,366,350 | A |   | 1/1968 | Hoffert |
| 3,409,228 | A |   | 11/1968 | Mehr |
| 3,610,533 | A |   | 10/1971 | Johnson |
| 3,635,029 | A |   | 1/1972 | Menioux |
| 3,747,855 | A | * | 7/1973 | Vdoviak ............... F02K 1/36 239/265.41 |
| 3,973,731 | A |   | 8/1976 | Thayer |
| 3,981,463 | A | * | 9/1976 | Pazmany ............... B64D 33/04 239/265.29 |
| 4,074,859 | A | * | 2/1978 | Lowman, Jr. ........... F02K 1/58 239/265.33 |
| 4,805,840 | A |   | 2/1989 | Tape |
| 5,098,022 | A |   | 3/1992 | Thayer |

(Continued)

OTHER PUBLICATIONS

EP Search Report for EP Patent Application No. 23187106.2 dated Dec. 5, 2023.

*Primary Examiner* — Todd E Manahan
*Assistant Examiner* — Rodolphe Andre Chabreyrie
(74) *Attorney, Agent, or Firm* — Getz Balich LLC

(57) ABSTRACT

A system is provided for an aircraft. This aircraft system includes an exhaust duct, an exhaust flow regulator, a nozzle bypass duct and a bypass flow regulator. The exhaust duct extends longitudinally to an exhaust nozzle. The exhaust flow regulator is configured to regulate fluid flow through the exhaust duct to the exhaust nozzle. The nozzle bypass duct projects out from a side of the exhaust duct. The bypass flow regulator is configured to regulate fluid flow from the exhaust duct into the nozzle bypass duct. The bypass flow regulator is disposed upstream of the exhaust flow regulator.

15 Claims, 11 Drawing Sheets

(56) References Cited

U.S. PATENT DOCUMENTS

| | | | | |
|---|---|---|---|---|
| 5,297,388 | A | * | 3/1994 | Nightingale ............ F02K 1/004 60/229 |
| 5,470,020 | A | | 11/1995 | Brossier |
| 5,485,958 | A | * | 1/1996 | Nightingale ............ F02K 1/006 239/265.19 |
| 5,720,453 | A | * | 2/1998 | Platt .......................... F02K 1/60 239/265.19 |
| 5,826,794 | A | | 10/1998 | Rudolph |
| 5,884,843 | A | | 3/1999 | Lidstone |
| 7,093,793 | B2 | | 8/2006 | Lair |
| 10,605,197 | B2 | * | 3/2020 | Sawyers-Abbott ....... F02K 1/72 |
| 2002/0189230 | A1 | | 12/2002 | Franchet |
| 2004/0195443 | A1 | | 10/2004 | Lair |
| 2013/0025259 | A1 | | 1/2013 | Beardsley |
| 2016/0040627 | A1 | | 2/2016 | Zsurka |
| 2017/0226960 | A1 | * | 8/2017 | Nakano ..................... F01D 7/00 |
| 2018/0094605 | A1 | * | 4/2018 | Rosenau ................. F02K 1/763 |
| 2018/0258881 | A1 | | 9/2018 | Schaefer |

* cited by examiner

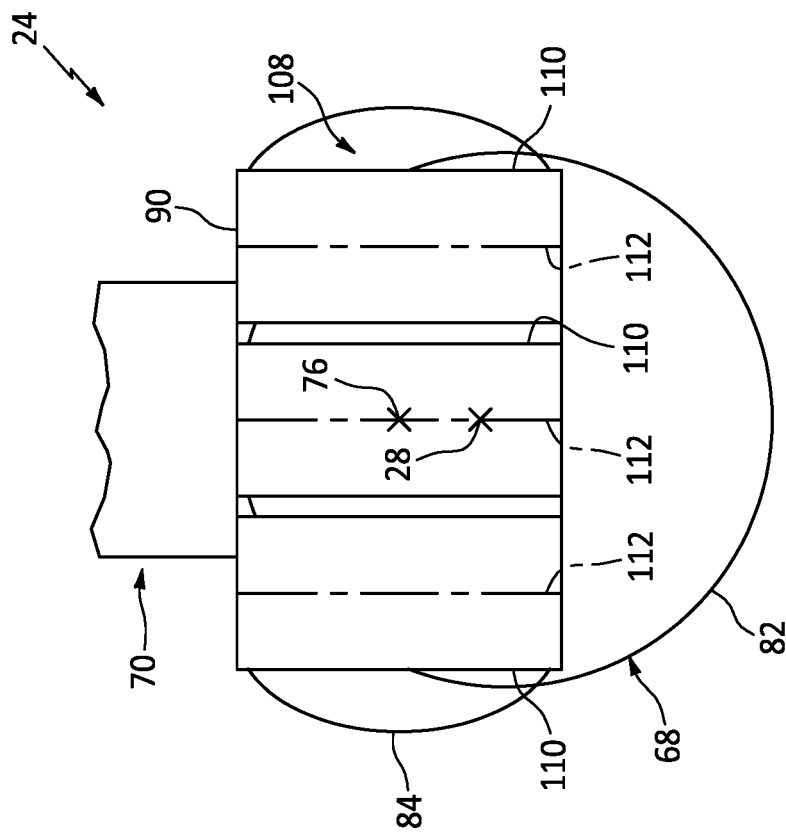
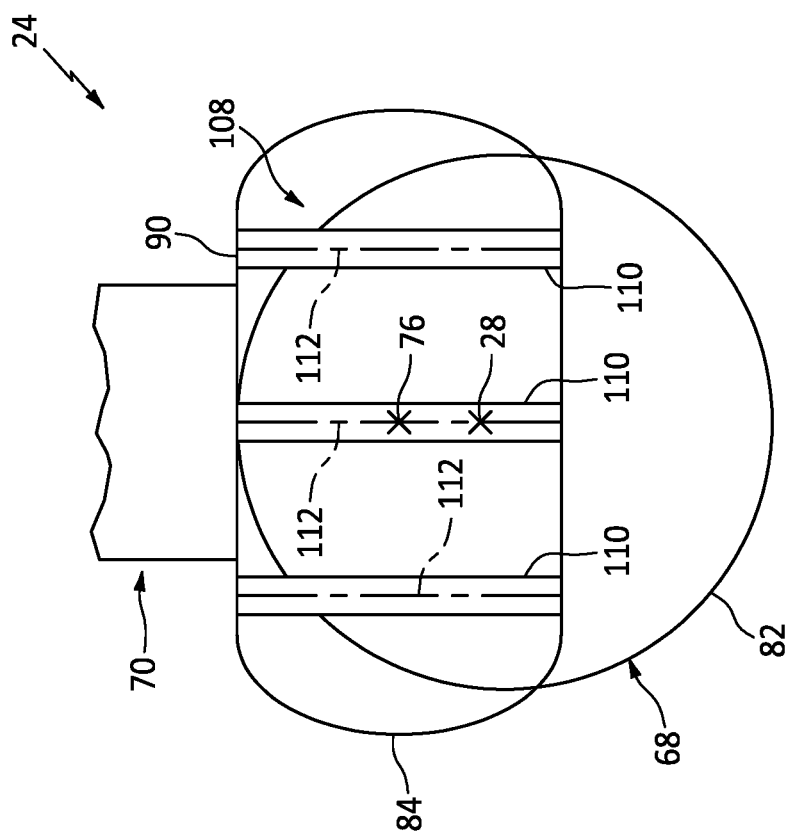
FIG. 3B
FIG. 3A

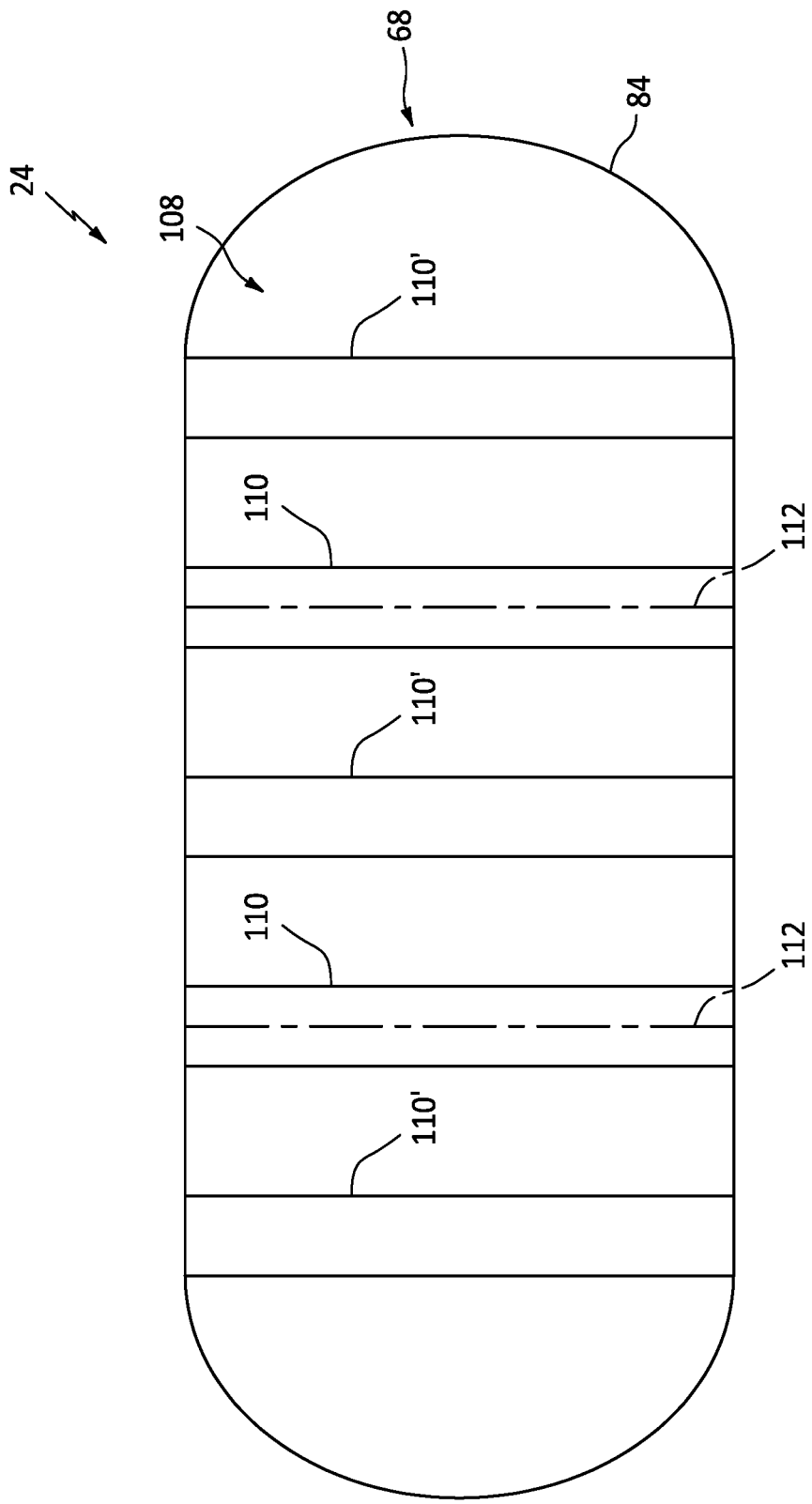

MULTI-DUCT EXHAUST SYSTEM FOR GAS TURBINE ENGINE

CROSS-REFERENCE TO RELATED APPLICATIONS

This application claims priority to U.S. Provisional Patent Application No. 63/391,496 filed Jul. 22, 2022, which is hereby incorporated herein by reference in its entirety.

BACKGROUND OF THE DISCLOSURE

1. Technical Field

This disclosure relates generally to an aircraft and, more particularly, to an exhaust system for a gas turbine engine.

2. Background Information

Various types and configurations of gas turbine engine exhaust systems are known in the art for an aircraft. While these known exhaust systems have various benefits, there is still room in the art for improvement.

SUMMARY OF THE DISCLOSURE

According to an aspect of the present disclosure, a system is provided for an aircraft. This aircraft system includes an exhaust duct, an exhaust flow regulator, a nozzle bypass duct and a bypass flow regulator. The exhaust duct extends longitudinally to an exhaust nozzle. The exhaust flow regulator is configured to regulate fluid flow through the exhaust duct to the exhaust nozzle. The nozzle bypass duct projects out from a side of the exhaust duct. The bypass flow regulator is configured to regulate fluid flow from the exhaust duct into the nozzle bypass duct. The bypass flow regulator is disposed upstream of the exhaust flow regulator.

According to another aspect of the present disclosure, another system is provided for an aircraft. This aircraft system includes an exhaust duct, a nozzle bypass duct and a bypass flow regulator. The exhaust duct extends longitudinally to an exhaust nozzle. An upstream section of the exhaust duct has a first cross-sectional geometry with a first shape. A downstream section of the exhaust duct has a second cross-sectional geometry with a second shape different than the first shape. The downstream section of the exhaust duct is located between the upstream section of the exhaust duct and the exhaust nozzle. The nozzle bypass duct projects out from a side of the downstream section of the exhaust duct. The bypass flow regulator is configured to regulate fluid flow from the exhaust duct into the nozzle bypass duct.

According to still another aspect of the present disclosure, another system is provided for an aircraft. This aircraft system includes an exhaust duct, a nozzle bypass duct, a bypass flow regulator and an exhaust flow regulator. The exhaust duct extends to an exhaust nozzle. The nozzle bypass duct extends to a bypass nozzle. The bypass flow regulator is configured to selectively fluidly couple the exhaust duct to the nozzle bypass duct. The exhaust flow regulator is configured to control backpressure within the exhaust duct downstream of the bypass flow regulator.

The bypass flow regulator may be configured as or otherwise include a pivoting door or a translating door.

The system may also include an exhaust flow regulator configured to regulate fluid flow within the downstream section of the exhaust duct to the exhaust nozzle.

The system may also include a compressor section, a combustor section, a turbine section and a core flowpath extending sequentially through the compressor section, the combustor section and the turbine section to the exhaust duct.

The system may also include a propulsor section, an engine core and a core bypass flowpath extending from the propulsor section, along and outside of the engine core, to the exhaust duct.

The system may also include a core flowpath extending through the engine core to the exhaust duct.

The system may also include a flowpath flow regulator configured to regulate bypass air flow out of the core bypass flowpath to the exhaust duct.

The exhaust nozzle may be configured to direct fluid out of the exhaust duct along an exhaust trajectory. The nozzle bypass duct may project out from the exhaust duct to a bypass duct outlet. The bypass duct outlet may be configured to direct fluid out of the nozzle bypass duct along a bypass trajectory that is different than the exhaust trajectory.

The exhaust trajectory and the bypass trajectory may each include at least (or only) an aft directional component.

The exhaust trajectory may include at least (or only) an aft directional component. The bypass trajectory may include at least (or only) a forward directional component.

The nozzle bypass duct may project out from the exhaust duct to a bypass duct outlet. The bypass duct outlet and the exhaust nozzle may be fluidly coupled in parallel with a section of the exhaust duct upstream of the bypass flow regulator when the bypass flow regulator is at least partially open.

The exhaust flow regulator may be configured as or otherwise include one or more movable louvers.

The exhaust flow regulator may be configured as or otherwise include a pivotable vane projecting across the exhaust duct downstream of the bypass flow regulator.

The bypass flow regulator may be configured as or otherwise include a door configured to pivot into the nozzle bypass duct.

The bypass flow regulator may be configured as or otherwise include a door configured to pivot into the exhaust duct.

The bypass flow regulator may be configured as or otherwise include a door configured to translate along the exhaust duct.

The nozzle bypass duct may project out from a portion of the exhaust duct at the side of the exhaust duct. The portion of the exhaust duct may have a flat geometry in a reference plane perpendicular to a longitudinal centerline of the exhaust duct.

The exhaust duct may include an upstream section and a downstream section. The upstream section may be upstream of the bypass flow regulator and may have a first cross-sectional geometry. The downstream section may be at the bypass flow regulator and may have a second cross-sectional geometry that is different than the first cross-sectional geometry.

The first cross-sectional geometry may have a circular shape. The second cross-sectional geometry may have an elongated shape.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 3A is a partial cross-sectional schematic illustration of the aircraft system with an exhaust flow regulator in an open position.

FIG. 3B is a partial cross-sectional schematic illustration of the aircraft system with the exhaust flow regulator in a closed position.

FIG. 9 is a cross-sectional schematic illustration of the exhaust duct with another exhaust flow regulator arrangement.

DETAILED DESCRIPTION

Figure 1:
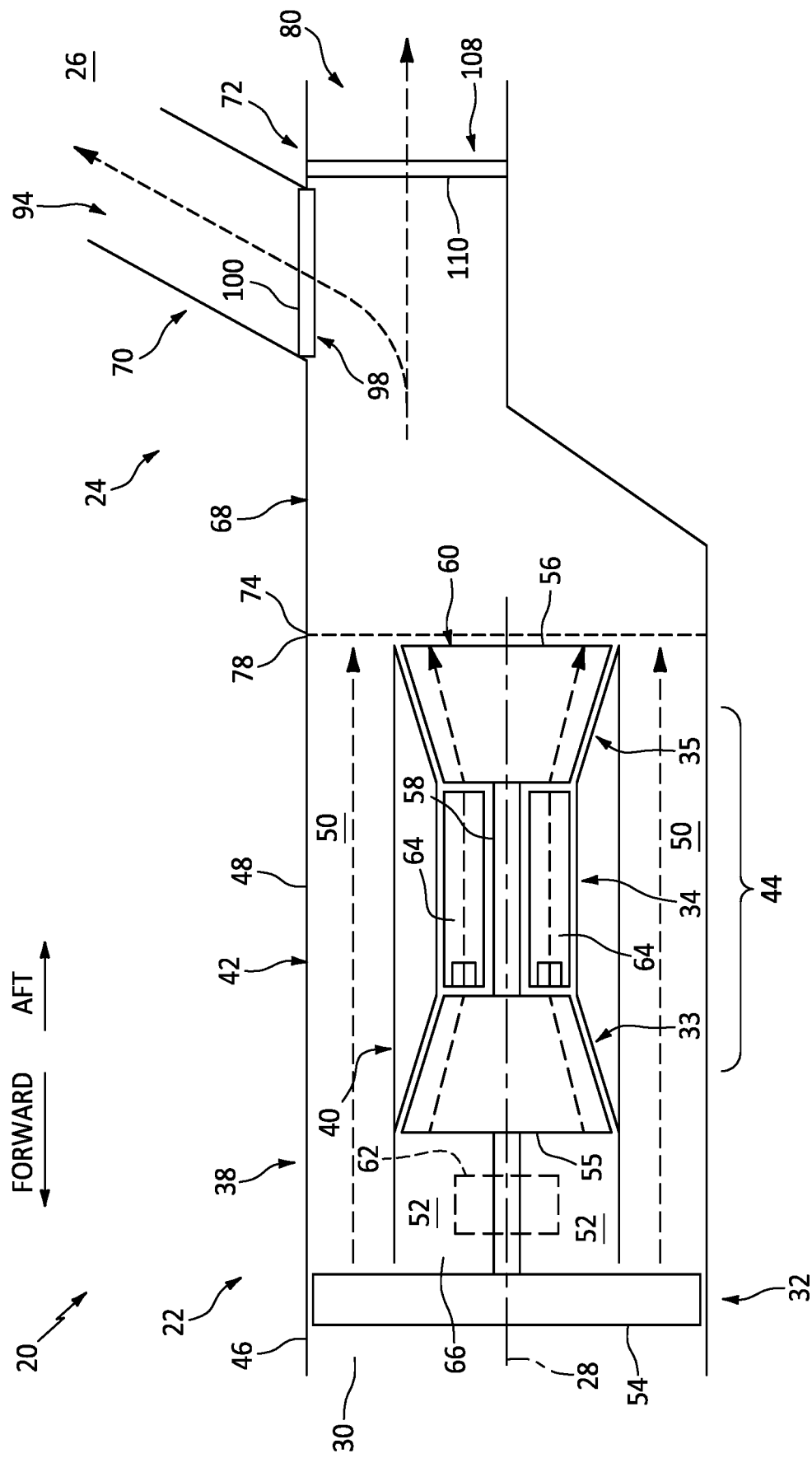
FIG. 1 is a side sectional schematic illustration of an aircraft system with a gas turbine engine and an exhaust system.

FIG. 1 illustrates a system 20 for an aircraft. This aircraft may be an airplane, a helicopter, a drone (e.g., an unmanned aerial vehicle (UAV)), a spacecraft or any other manned or unmanned aerial vehicle. The aircraft system 20 of FIG. 1 includes a gas turbine engine 22 and an engine exhaust system 24 for exhausting a fluid flow (e.g., a gas flow) received from the gas turbine engine 22 into an exterior environment 26; e.g., an environment outside of/surrounding the aircraft.

The gas turbine engine 22 of FIG. 1 extends axially along an axial centerline 28 between an upstream airflow inlet 30 and the downstream exhaust system 24. The gas turbine engine 22 includes a propulsor section 32, a compressor section 33, a combustor section 34 and a turbine section 35. The propulsor section 32 may be configured as a fan section where, for example, the gas turbine engine 22 is a turbofan gas turbine engine. The propulsor section 32 may alternatively be configured as another (e.g., low pressure) compressor section where, for example, the gas turbine engine 22 is a turbojet gas turbine engine. The propulsor section 32 may include one or more stages or rotating and/or static parts.

The propulsor section 32, the compressor section 33, the combustor section 34 and the turbine section 35 may be arranged sequentially along the axial centerline 28 within an engine housing 38. This engine housing 38 includes an inner casing structure 40 (e.g., a core case) and an outer casing structure 42. The inner casing structure 40 houses one or more or all of the engine sections 33-35; e.g., a core 44 of the gas turbine engine 22. The outer casing structure 42 includes a propulsor case 46 and a propulsor duct 48 connected to and disposed aft, downstream of the propulsor case 46. The outer casing structure 42 and its propulsor case 46 house the propulsor section 32. The outer casing structure 42 and its propulsor duct 48 axially overlap the inner casing structure 40 thereby forming an engine core bypass flowpath 50 radially between the inner casing structure 40 and the outer casing structure 42. This core bypass flowpath 50 extends from the propulsor section 32 to the exhaust system 24 radially outboard of the engine core 44. The core bypass flowpath 50 thereby bypasses the engine core 44. By contrast, a core flowpath 52 extends sequentially through the compressor section 33, the combustor section 34 and the turbine section 35 from the propulsor section 32 to the exhaust system 24. The core flowpath 52 thereby extends through the engine core 44.

The propulsor section 32, the compressor section 33 and the turbine section 35 each include a respective bladed rotor 54-56. Each of these rotors 54-56 may be rotatable about the axial centerline 28. Each of the rotors 54-56 includes a plurality of rotor blades arranged circumferentially around and connected to one or more respective rotor disks or hubs. The rotor blades, for example, may be formed integral with or mechanically fastened, welded, brazed, adhered and/or otherwise attached to the respective rotor disk(s) or hub(s).

The turbine rotor 56 is coupled to and is configured to drive rotation of the compressor rotor 55 and the propulsor rotor 54. The coupling between the turbine rotor 56 and the compressor rotor 55 may be a direct drive connection such that the turbine rotor 56 and the compressor rotor 55 rotate at a common (the same) speed. The turbine rotor 56, for example, may be connected to the compressor rotor 55 by an engine shaft 58. The compressor rotor 55, the turbine rotor 56 and the engine shaft 58 may collectively form or may otherwise be included in an engine rotating structure 60. A coupling between the rotating structure 60 and is turbine rotor 56 may be a direct drive connection such that the turbine rotor 56 and the propulsor rotor 54 (e.g., as well as the compressor rotor 55) rotate at a common (the same) speed. The turbine rotor 56, for example, may be connected to the propulsor rotor 54 by the engine shaft 58. With such an arrangement, the rotating structure 60 also includes the propulsor rotor 54. Alternatively, the coupling between the rotating structure 60 and its turbine rotor 56 and the propulsor rotor 54 may be a geared connection such that the turbine rotor 56 and the propulsor rotor 54 may rotate at different speeds. The propulsor rotor 54, for example, may be connected to the rotating structure 60 and its turbine rotor 56 through a gearbox 62; e.g., an epicyclic geartrain.

During operation, air enters the gas turbine engine 22 through the airflow inlet 30. This air is directed through the propulsor section 32 and into the core flowpath 52 and the core bypass flowpath 50. The air within the core flowpath 52 may be referred to as "core air". The air within the core bypass flowpath 50 may be referred to as "bypass air".

The core air is compressed by the compressor rotor 55 and directed into a combustion chamber 64 of a combustor in the combustor section 34. Fuel is injected into the combustion chamber 64 and mixed with the compressed core air to provide a fuel-air mixture. This fuel-air mixture is ignited and combustion products thereof flow through the turbine section to the exhaust system 24. The flow of the combustion products through the turbine section 35 causes the turbine rotor 56 to rotate. The rotation of the turbine rotor 56 drives rotation of the compressor rotor 55 and, thus, compression of the air received from a core airflow inlet 66. The rotation of the turbine rotor 56 also drives rotation of the propulsor rotor 54. The rotation of the propulsor rotor 54 propels the bypass air through the core bypass flowpath 50 to the exhaust system 24.

The propulsion of the bypass air may account for a majority of thrust generated by the gas turbine engine 22, e.g., more than fifty percent (50%) of engine thrust. The gas turbine engine 22 of the present disclosure, however, is not limited to the foregoing exemplary thrust ratio. Furthermore, the gas turbine engine 22 of the present disclosure is not limited to the foregoing exemplary engine configuration. For example, the gas turbine engine 22 may include a separate turbine rotor (e.g., a power turbine rotor) for driving rotation of the propulsor rotor 54. The gas turbine engine 22 may also or alternatively include multiple rotating structures (e.g., spools) such that, for example, the compressor section 33 includes at least a low pressure compressor (LPC) rotor and a high pressure compressor (HPC) rotor and/or the turbine section 35 includes at least a high pressure turbine (HPT) rotor and a low pressure turbine (LPT) rotor. The gas turbine engine 22 may also or alternatively be configured without the propulsor section 32 in certain embodiments where the exhaust system 24 receives the combustion products without the bypass air. The gas turbine engine 22 may also or alternatively be configured to change (e.g., regulate) bypass air flow during gas turbine engine operation such that, for example, the exhaust system 24 receives the combustion products with different amounts of the bypass air. The gas turbine engine 22 of FIG. 1, for example, may include an optional flow regulator 67 that regulates the bypass air flow out of the core bypass flowpath 50 to the exhaust system 24. The present disclosure therefore is not limited to any particular gas turbine engine types or configurations.

The exhaust system 24 of FIG. 1 is configured to selectively direct the fluid flow (e.g., the combustion products and/or the bypass air) received from the gas turbine engine 22 into the exterior environment 26. The exhaust system 24 of FIGS. 2A and 2B, for example, includes an (e.g., tubular) engine exhaust duct 68 and a (e.g., tubular) nozzle bypass duct 70; e.g., a thrust bypass duct. The exhaust system 24 of FIGS. 2A and 2B also includes a fluid flow regulation system 72.

The exhaust duct 68 is connected to (or may be an aft, downstream part of) the engine housing 38. The exhaust duct 68 of FIGS. 2A and 2B, for example, is connected to the outer casing structure 42 and its propulsor duct 48 at (e.g., on, adjacent or proximate) an aft, downstream end 74 of the outer casing structure 42 and its propulsor duct 48. The exhaust duct 68 extends longitudinally along a longitudinal centerline 76 of the exhaust duct 68 (e.g., generally axially along the axial centerline 28) from a forward, upstream end 78 of the exhaust system 24 and its exhaust duct 68 (e.g., at the outer casing structure downstream end 74) to an aft, downstream exhaust nozzle 80.

Figure 2A:
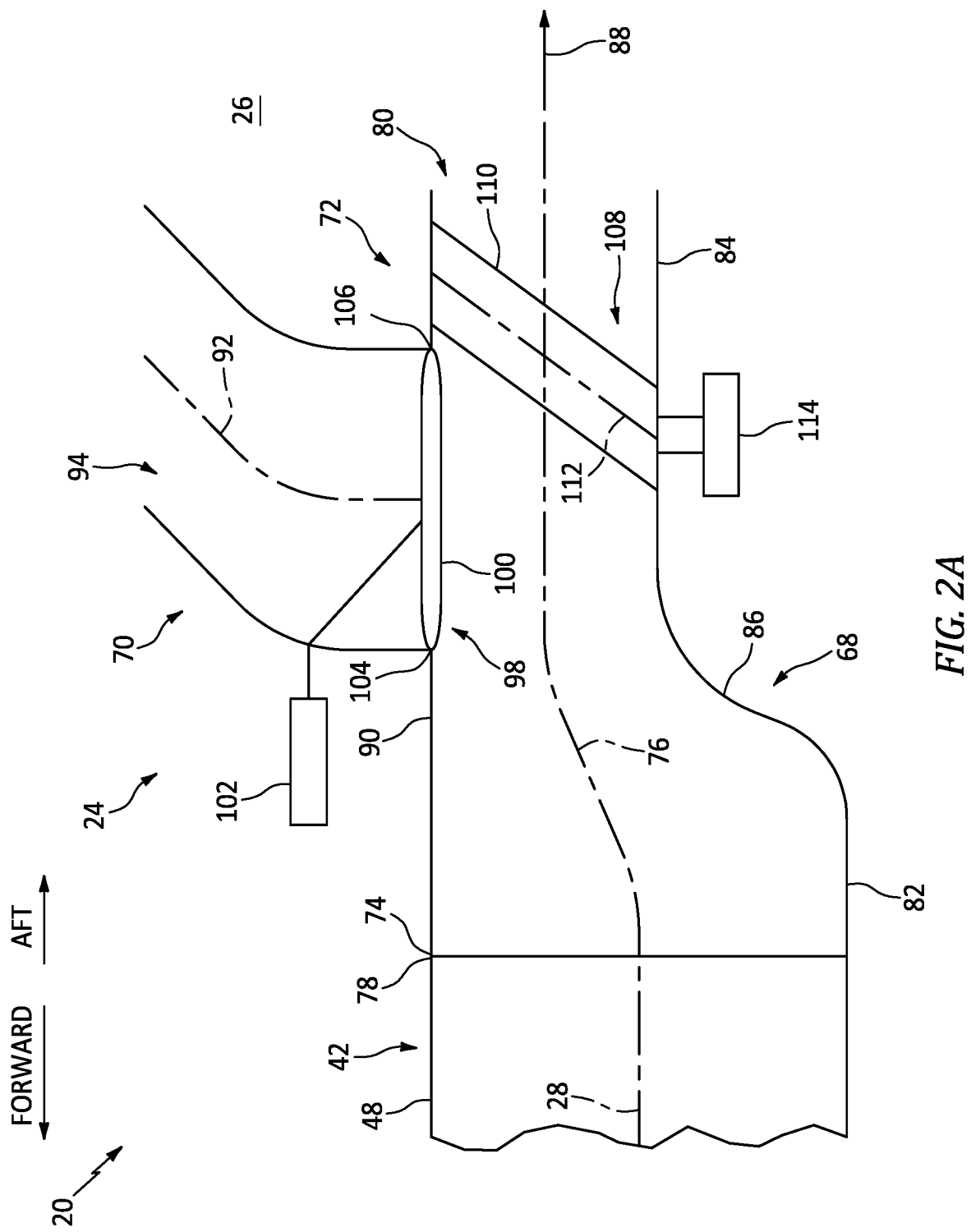
FIG. 2A is a partial side sectional schematic illustration of the aircraft system with a bypass flow regulator in a closed position.
Figure 2B:
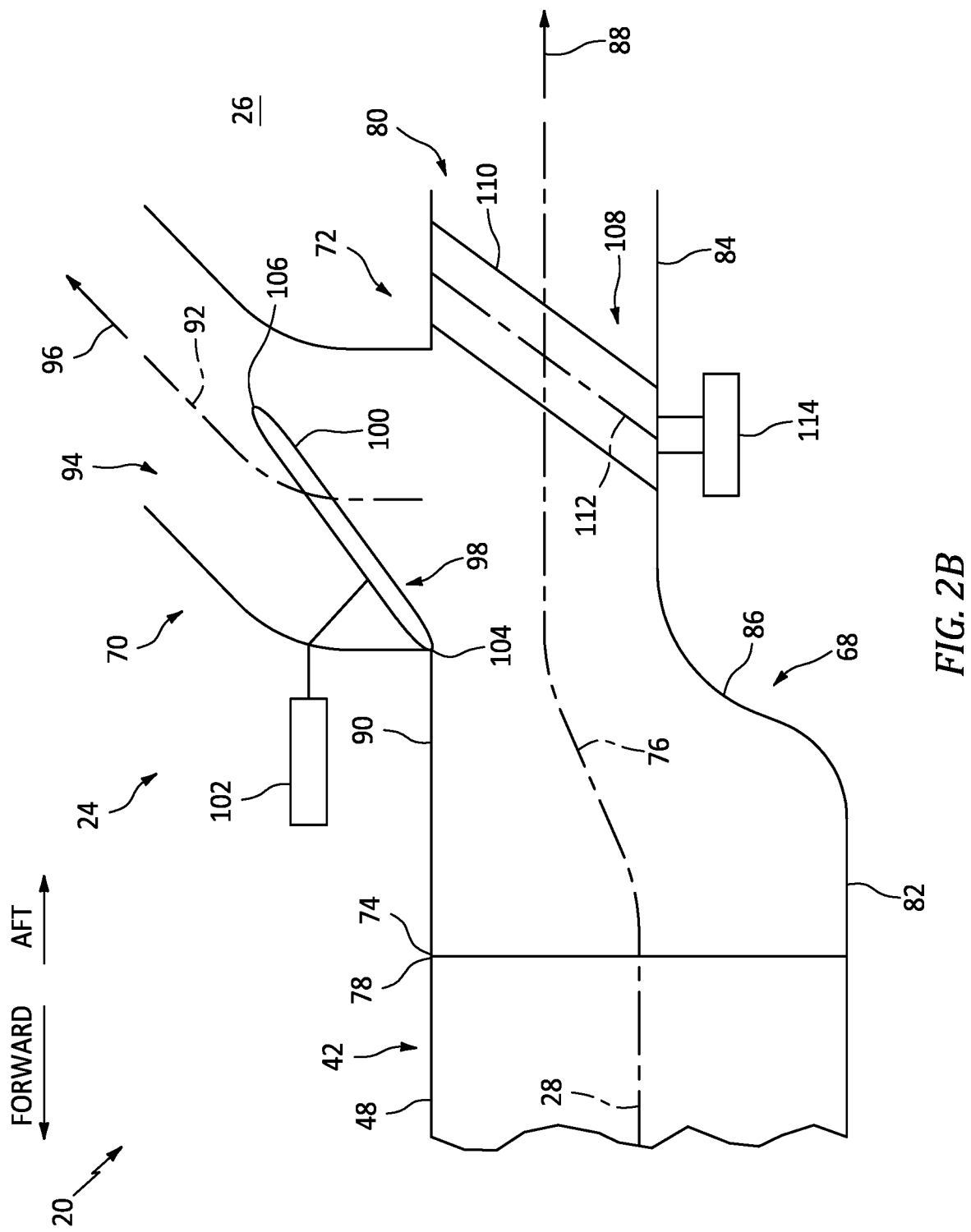
FIG. 2B is a partial side sectional schematic illustration of the aircraft system with the bypass flow regulator in an open position.

The exhaust duct 68 has a tubular geometry and forms a solid (e.g., non-annular) internal exhaust duct flowpath through the exhaust system 24. The exhaust duct 68 of FIGS. 2A and 2B includes a forward, upstream section 82, an aft, downstream section 84 and an intermediate (e.g., transition) section 86. The exhaust duct upstream section 82 is disposed at the exhaust duct upstream end 78. Referring to FIGS. 3A and 3B, this exhaust duct upstream section 82 may have a cross-sectional geometry with a circular shape when viewed, for example, in a reference plane perpendicular to the longitudinal centerline 76 and/or the axial centerline 28. The exhaust duct downstream section 84 of FIGS. 2A and 2B is disposed at an aft, downstream end of the exhaust duct 68, and/or may form the exhaust nozzle 80. Referring to FIGS. 3A and 3B, this exhaust duct downstream section 84 may have a cross-sectional geometry with an elongated shape (e.g., an oval shape, an elliptical shape, a racetrack shape, a rectangular shape, etc.) when viewed, for example, in a reference plane perpendicular to the longitudinal centerline 76 and/or the axial centerline 28. The exhaust duct intermediate section 86 of FIGS. 2A and 2B extends longitudinally along the longitudinal centerline 76 between and to the exhaust duct upstream section 82 and the exhaust duct downstream section 84. This exhaust duct intermediate section 86 may have a cross-sectional geometry that (e.g., continuously or stepwise) transitions from the cross-sectional geometry of the exhaust duct upstream section 82 to the cross-sectional geometry of the exhaust duct downstream section 84. The present disclosure, however, is not limited to such an exemplary exhaust duct configuration. For example, the cross-sectional geometry of the exhaust duct upstream section 82 may alternatively have a non-circular shape and/or the cross-sectional geometry of the exhaust duct downstream section 84 may alternatively have a circular or otherwise non-elongated shape. In another example, the exhaust duct 68 may have a constant cross-sectional geometry (e.g., size and shape) along its longitudinal length.

The exhaust nozzle 80 of FIG. 2A is configured to direct the fluid flow out of the exhaust system 24 and its exhaust duct 68 along an exhaust trajectory 88. This exhaust trajectory 88 of FIG. 2A may be substantially in an aft direction. The exhaust trajectory 88, for example, may be substantially (e.g., within +/−five degrees) or completely parallel with the axial centerline 28 and/or a horizon line in an aft direction; e.g., relative to normal forward flight of the aircraft. The present disclosure, however, is not limited to such an exemplary exhaust trajectory. Furthermore, while the exhaust nozzle 80 is described as a fixed trajectory exhaust nozzle, the exhaust nozzle 80 may alternatively be configured as a thrust vectoring exhaust nozzle in other embodiments. The exhaust nozzle 80 may also or alternatively be configured as a fixed area exhaust nozzle or a variable area exhaust nozzle.

The nozzle bypass duct 70 is connected to the exhaust duct 68. The nozzle bypass duct 70 of FIGS. 2A and 2B, for example, is connected to a side 90 of the exhaust duct downstream section 84 and/or the exhaust duct intermediate section 86. This nozzle bypass duct 70 projects longitudinally along a longitudinal centerline 92 of the nozzle bypass duct 70 outward from the exhaust duct 68 and its section(s) 84 and/or 86 to a bypass duct outlet 94; e.g., a nozzle or a diffuser. At least a portion or an entirety of the nozzle bypass duct longitudinal centerline 92 may be angularly offset from the exhaust duct longitudinal centerline 76 by an angle. This angle may remain constant or may vary as shown, for example, in FIGS. 2A and 2B. The angle may be greater than zero degrees(0°) and equal to or less than ninety degrees (90°). For example, at a connection between the nozzle bypass duct 70 and the exhaust duct 68, the angle may be between eighty and ninety degrees. At the bypass duct outlet 94, the angle may be between thirty-five and fifty-five degrees. The present disclosure, however, is not limited to such an exemplary configuration.

Figure 4:
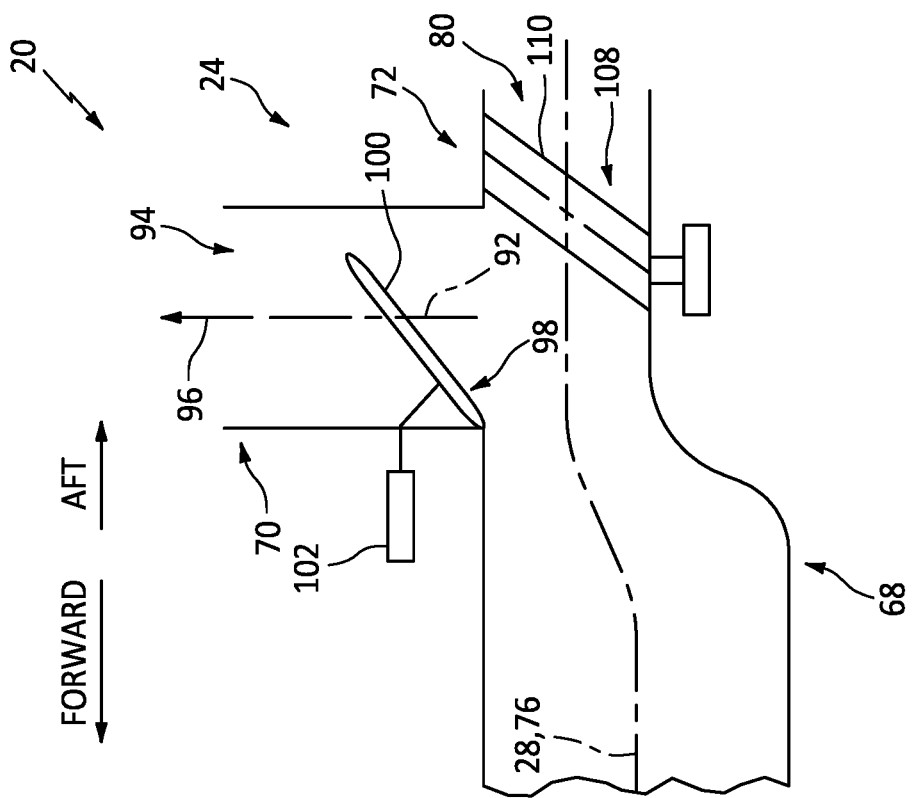
FIG. 4 is a partial side sectional schematic illustration of the aircraft system with a forward facing nozzle bypass duct.
Figure 5:
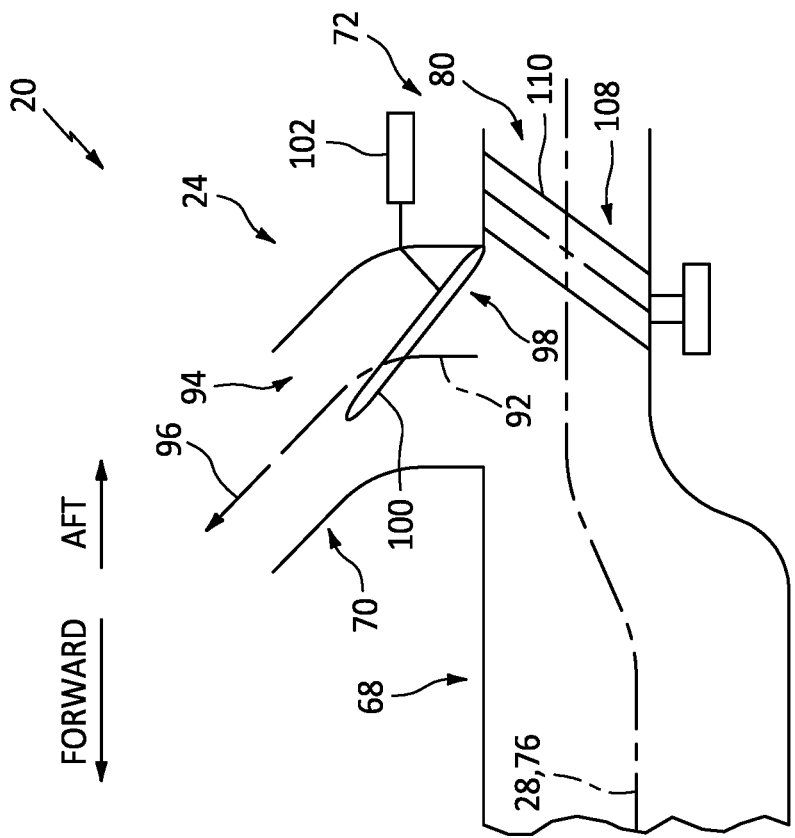
FIG. 5 is a partial side sectional schematic illustration of the aircraft system with an outward facing nozzle bypass duct.

The bypass duct outlet 94 of FIG. 2B is configured to direct the fluid flow out of the exhaust system 24 and its nozzle bypass duct 70 along a bypass trajectory 96. This bypass trajectory 96 of FIG. 2B may be in an aft and outward direction. The bypass trajectory 96, for example, may be angularly offset from the axial centerline 28, the horizon line and/or the exhaust trajectory 88 by an acute angle. However, the bypass trajectory 96 may include an aft directional component; e.g., relative to normal forward flight of the aircraft. This aft directional component, for example, may be in a direction parallel to the centerline 28 and/or 76 and away from the gas turbine engine 22 along the centerline 28 and/or 76. Note, the exhaust nozzle 80 may direct flow in the aft direction. Alternatively, referring to FIG. 4, the bypass trajectory 96 may alternatively include a forward directional component. This forward directional component, for example, may be in a direction parallel to the centerline 28 and/or 76 and towards the gas turbine engine 22 along the centerline 28 and/or 76. Still alternatively, referring to FIG. 5, the bypass trajectory 96 may include neither an aft nor a forward directional component, but rather extend substantially or completely outward.

Referring to FIGS. 2A and 2B, the fluid flow regulation system 72 includes a bypass flow regulator 98; e.g., a valve mechanism, a flow modulating mechanism, etc. This bypass flow regulator 98 is configured to regulate (e.g., control) fluid flow from the exhaust duct 68 into the nozzle bypass duct 70. The bypass flow regulator 98, for example, may selectively fluidly decouple (e.g., see FIG. 2A) or fluidly couple (e.g., see FIG. 2B) the exhaust duct 68 and the nozzle bypass duct 70. With this arrangement, the bypass flow regulator 98 of FIG. 2A may close (or reduce flow into the nozzle bypass duct 70) during normal aircraft flight such that the fluid flow received from the gas turbine engine 22 (see FIG. 1) is substantially or only directed through the exhaust nozzle 80 to provide forward thrust. However, during aircraft landing, aircraft takeoff and/or one or more other aircraft maneuvers, the bypass flow regulator 98 of FIG. 2B may open such that at least some (e.g., less than 50%, 50% or more than 50%) of the fluid flow received from the gas turbine engine 22 (see FIG. 1) is also directed through the bypass duct outlet 94. This may serve to reduce engine thrust provided by the exhaust system 24 and/or redirect (e.g., vector) the airflow and/or thrust produced by the gas turbine engine 22.

Figure 6A:
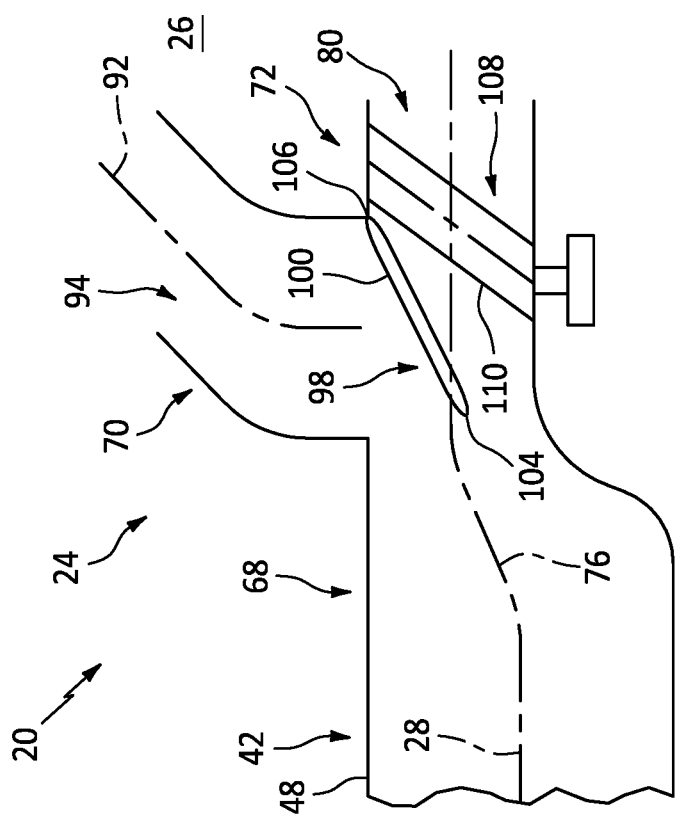
FIG. 6A is a partial side sectional schematic illustration of the aircraft system with another exhaust flow regulator arrangement in an open position.
Figure 6B:
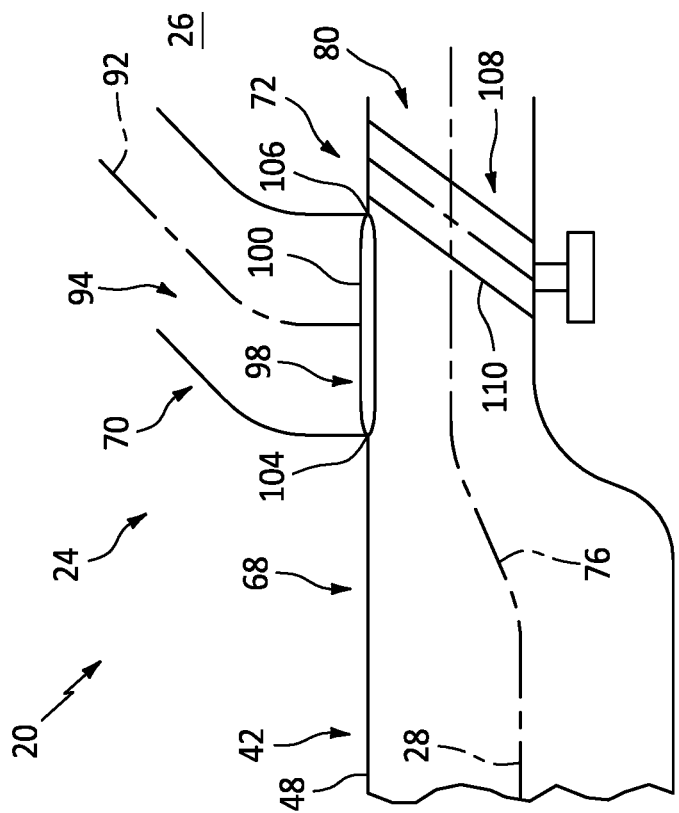
FIG. 6B is a partial side sectional schematic illustration of the aircraft system with the exhaust flow regulator arrangement of FIG. 6A in a closed position.
Figure 7B:
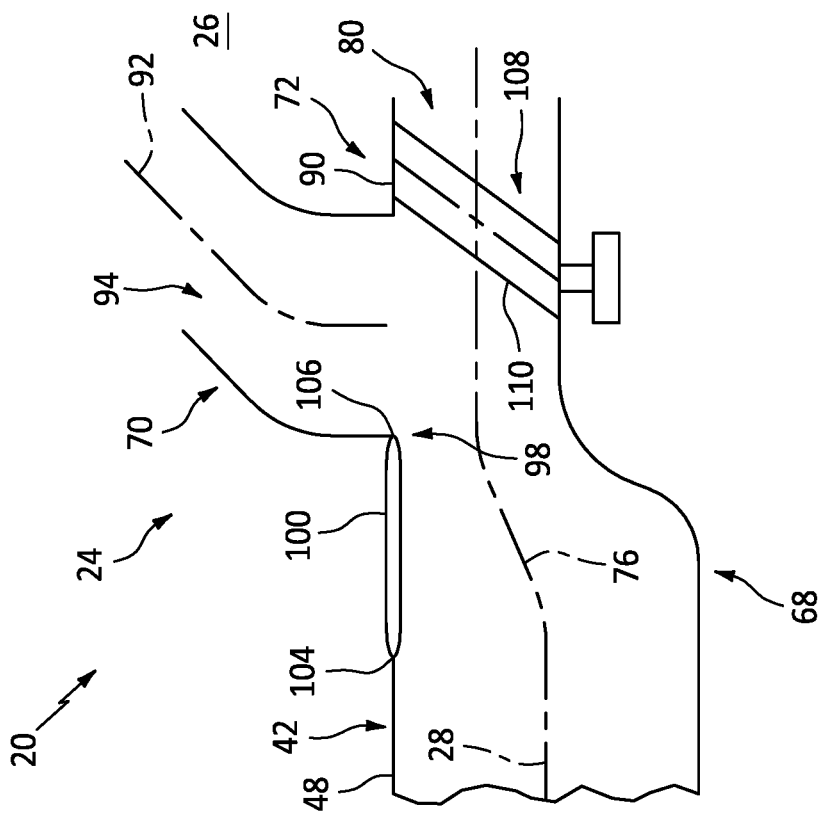
FIG. 7B is a partial side sectional schematic illustration of the aircraft system with the exhaust flow regulator arrangement of FIG. 7A in a closed position.
Figure 7A:
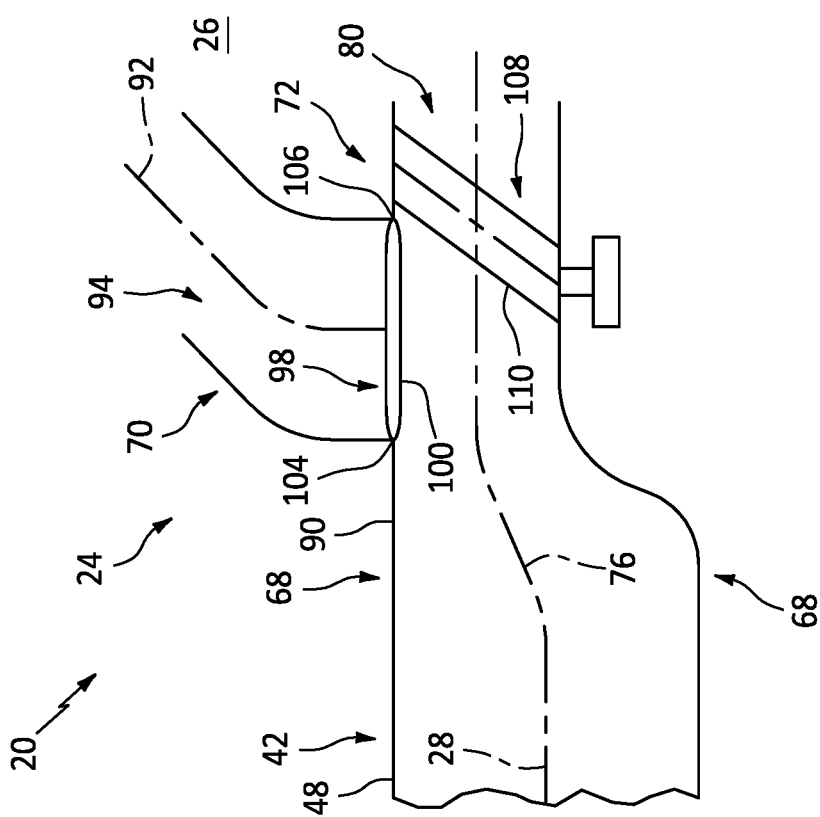
FIG. 7A is a partial side sectional schematic illustration of the aircraft system with still another exhaust flow regulator arrangement in an open position.

The bypass flow regulator 98 of FIGS. 2A and 2B includes a regulator door 100 and an actuator 102 for moving the regulator door 100. The regulator door 100 is configured to move (e.g., pivot) between a closed position (e.g., see FIG. 2A) and an open position (e.g., see FIG. 2B). Of course, the regulator door 100 may also move to one or more intermediate positions between the closed position of FIG. 2A and the open position of FIG. 2B. In the embodiments of FIGS. 2A and 2B, the regulator door 100 pivots into the nozzle bypass duct 70 from the closed position of FIG. 2A to the open position of FIG. 2B. Here, a forward, upstream end 104 of the regulator door 100 may be pivotally coupled to a stationary support structure; e.g., the exhaust duct 68 and/or the nozzle bypass duct 70. In other embodiments however, referring to FIGS. 6A and 6B, the regulator door 100 may pivot into the exhaust duct 68 from the closed position of FIG. 6A to the open position of FIG. 6B. Here, an aft, downstream end 106 of the regulator door 100 may be pivotally coupled to the stationary support structure. In still other embodiments, referring to FIGS. 7A and 7B, the regulator door 100 translates (e.g., slides) along the side 90 of the exhaust duct 68 between the closed position of FIG. 7A and the open position of FIG. 7B.

Figure 8B:
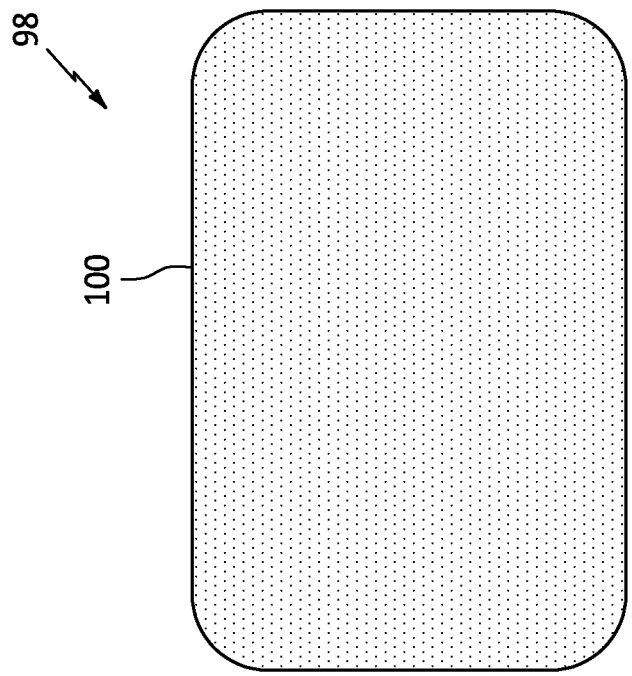
FIG. 8B is an illustration of a perforated regulator door.
Figure 8A:
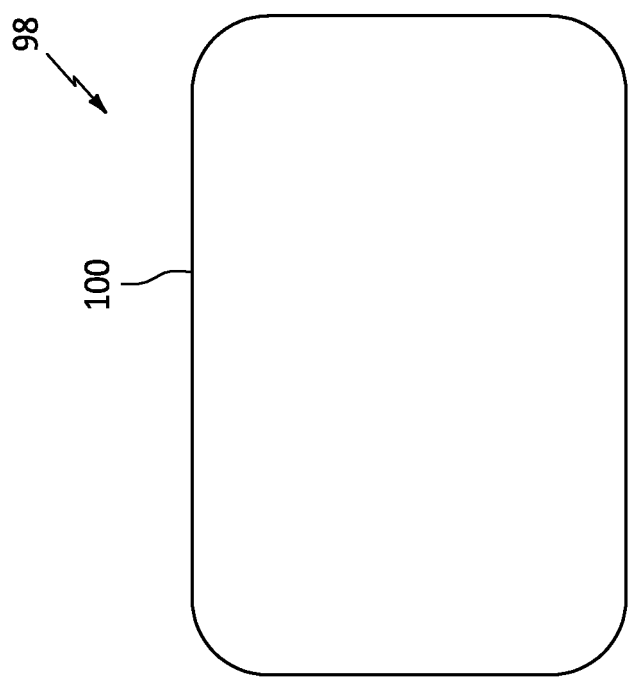
FIG. 8A is an illustration of a solid regulator door.

In some embodiments, referring to FIG. 8A, the regulator door 100 may be formed from or otherwise include a solid, non-perforated panel. In other embodiments, referring to FIG. 8B, the regulator door 100 may be formed from or otherwise include a perforated panel; e.g., a panel with one or more perforations such as, but not limited to, through-holes.

Referring to FIGS. 2A and 2B, the fluid flow regulation system 72 may also include an exhaust flow regulator 108 (e.g., a valve mechanism, a flow modulating mechanism, etc.) to provide additional exhaust system fluid flow control. This exhaust flow regulator 108 is arranged within the exhaust duct 68 downstream of the bypass flow regulator 98/an opening to the nozzle bypass duct 70. The exhaust flow regulator 108 of FIGS. 2A and 2B, for example, is disposed within the exhaust duct downstream section 84 and upstream of the exhaust nozzle 80. The exhaust flow regulator 108 is configured to regulate (e.g., control) fluid flow through the exhaust duct 68 to the exhaust nozzle 80. The exhaust flow regulator 108 may also regulate (e.g., control) fluid flow from the exhaust duct 68 to the nozzle bypass duct 70. The exhaust flow regulator 108, for example, may move between an open position (e.g., see FIG. 3A) and a closed position (e.g., see FIG. 3B). When the exhaust flow regulator 108 is in the open position of FIG. 3A, a backpressure at the exhaust flow regulator 108 is relatively small and the fluid flow through the exhaust flow regulator 108 to the exhaust nozzle 80 may be relatively large. However, when the exhaust flow regulator 108 is in the closed position of FIG. 3B, the backpressure at the exhaust flow regulator 108 is relatively large and the fluid flow through the exhaust flow regulator 108 to the exhaust nozzle 80 may be relatively small. Thus, referring to FIG. 2B, by increasing the backpressure downstream of the bypass flow regulator 98/reducing fluid flow through the exhaust flow regulator 108 to the exhaust nozzle 80, the exhaust flow regulator 108 may functionally increase fluid flow into the nozzle bypass duct 70 when the fluid flow regulation system 72 is open. It is contemplated that the exhaust flow regulator 108 may be actuated (e.g., opened and closed) when the bypass flow regulator 98 is closed (e.g., see FIG. 2A) and/or opened (e.g., see FIG. 2B).

The exhaust flow regulator 108 of FIGS. 3A and 3B may be configured as a set of (e.g., moveable, adjustable, etc.) louvers. The exhaust flow regulator 108 of FIGS. 3A and 3B, for example, includes one or more moveable (e.g., pivotable) regulator vanes 110; e.g., louvers, exhaust exit guide vanes, etc. These regulator vanes 110 are arranged side-by-side in an array. Each of the regulator vanes 110 extends laterally across the exhaust duct downstream section 84 between and to opposing sides of the exhaust duct 68. Each of the regulator vanes 110 may be configured to move (e.g., pivot) about a respective vane axis 112. These regulator vanes 110 may be simultaneously, staged or otherwise moved (e.g., pivoted) by at least one actuator 114 (see FIGS. 2A and 2B) between the open position of FIG. 3A and the closed position of FIG. 3B.

In some embodiments, each of the regulator vanes 110 may move between the open position of FIG. 3A and the closed position of FIG. 3B as described above. In other embodiments, referring to FIG. 9, the exhaust flow regulator 108 may also include one or more stationary regulator vanes 110'. These stationary vanes 110' may be non-structural or may also be configured as struts for structurally supporting the exhaust duct 68.

Figure 10B:
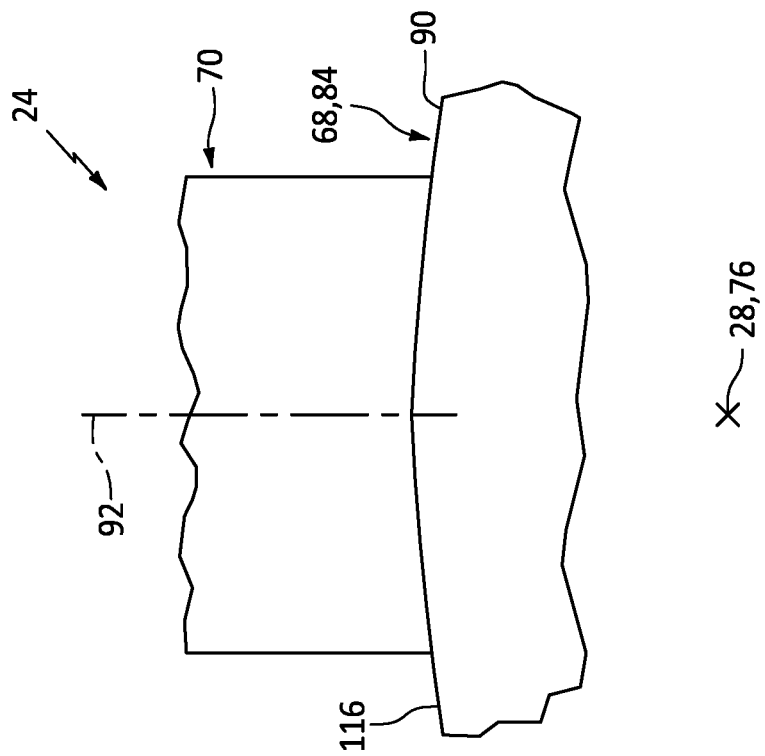
FIG. 10B is a partial cross-sectional schematic illustration of the nozzle bypass duct projecting out from a non-flat portion of the exhaust duct.
Figure 10A:
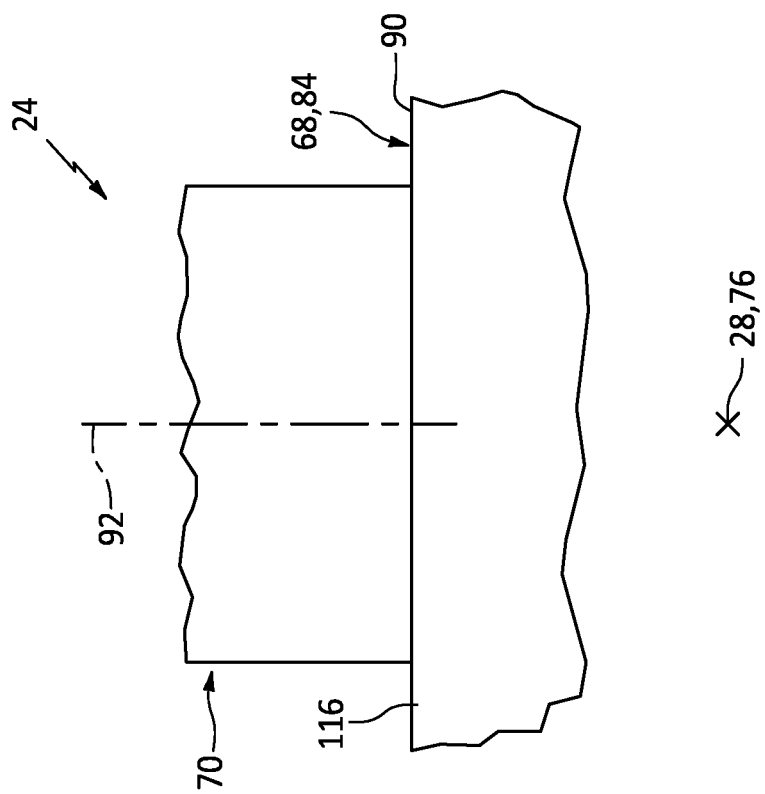
FIG. 10A is a partial cross-sectional schematic illustration of the nozzle bypass duct projecting out from a flat portion of the exhaust duct.

In some embodiments, referring to FIG. 10A, the nozzle bypass duct 70 may project out from a portion 116 of the exhaust duct 68 with a flat geometry when viewed, for example, in a reference plane perpendicular to the longitudinal centerline 76 and/or the axial centerline 28. Such a flat geometry may facilitate sealing with the regulator door 100 when closed. However in other embodiments, referring to FIG. 10B, the exhaust duct portion 116 may have a non-flat (e.g., arcuate, splined, etc.) geometry when viewed, for example, in the reference plane.

Figure 11:
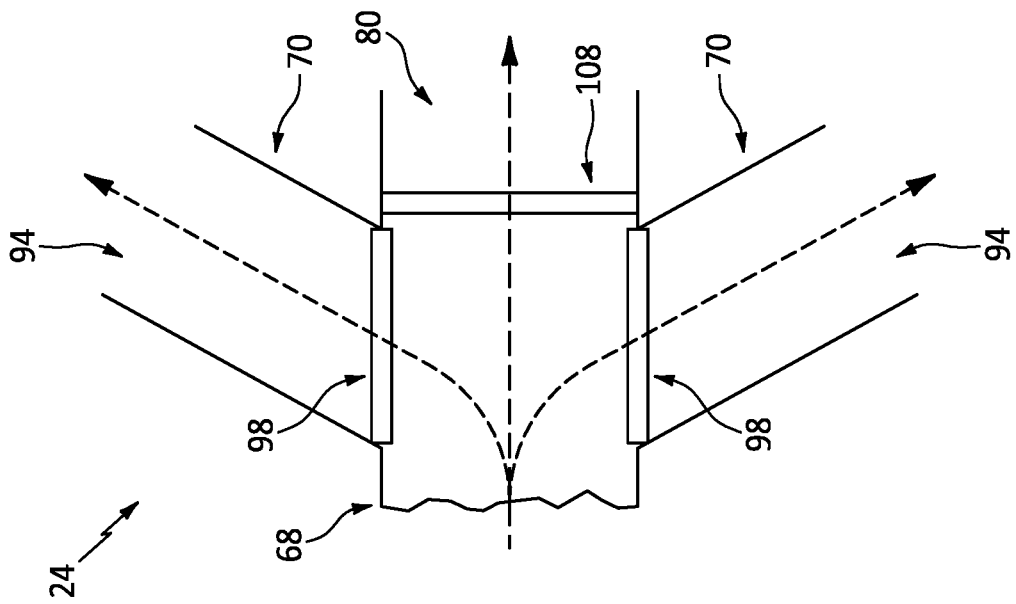
FIG. 11 is a partial schematic illustration of the exhaust system with multiple nozzle bypass ducts.

In some embodiments, the exhaust system 24 may (e.g., only) include the single exhaust duct 68 and the single nozzle bypass duct 70. However in other embodiments, referring to FIG. 11, the exhaust system 24 may include multiple of the nozzle bypass ducts 70, for example, similarly arranged and configured. In the embodiment of FIG. 11, the nozzle bypass ducts 70 are arranged on opposing sides of the exhaust duct 68; however, the present disclosure is not limited to such an exemplary arrangement.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
an exhaust duct extending longitudinally to an exhaust nozzle, the exhaust nozzle configured to direct fluid out of the exhaust duct along an exhaust trajectory with an aft directional component;
an exhaust flow regulator configured to regulate fluid flow through the exhaust duct to the exhaust nozzle;
a nozzle bypass duct projecting out from a side of the exhaust duct to a bypass duct outlet, the bypass duct outlet configured to direct fluid out of the nozzle bypass duct along a bypass trajectory with an aft directional component such that the fluid is exhausted out from the bypass duct outlet in an aft direction comprising the aft directional component, and the bypass trajectory different than the exhaust trajectory; and
a bypass flow regulator configured to regulate fluid flow from the exhaust duct into the nozzle bypass duct, the bypass flow regulator disposed upstream of the exhaust flow regulator;
wherein the nozzle bypass duct projects out from a portion of the exhaust duct at the side of the exhaust duct, the portion of the exhaust duct has a flat geometry in a reference plane, and the reference plane is perpendicular to a longitudinal centerline of the exhaust duct.

2. The system of claim 1, further comprising:
a compressor section;
a combustor section;
a turbine section; and
a core flowpath extending sequentially through the compressor section, the combustor section and the turbine section to the exhaust duct.

3. The system of claim 1, further comprising:
a propulsor section;
an engine core; and
a core bypass flowpath extending from the propulsor section, along and outside of the engine core, to the exhaust duct.

4. The system of claim 3, further comprising a core flowpath extending through the engine core to the exhaust duct.

5. The system of claim 3, further comprising a flowpath flow regulator configured to regulate bypass air flow out of the core bypass flowpath to the exhaust duct.

6. The system of claim 1, wherein the bypass duct outlet and the exhaust nozzle are fluidly coupled in parallel with a section of the exhaust duct upstream of the bypass flow regulator when the bypass flow regulator is at least partially open.

7. The system of claim 1, wherein the exhaust flow regulator comprises one or more movable louvers.

8. The system of claim 1, wherein the exhaust flow regulator comprises a pivotable vane projecting across the exhaust duct downstream of the bypass flow regulator.

9. The system of claim 1, wherein the bypass flow regulator comprises a door configured to pivot into the nozzle bypass duct.

10. The system of claim 1, wherein the bypass flow regulator comprises a door configured to pivot into the exhaust duct.

11. The system of claim 1, wherein the bypass flow regulator comprises a door configured to translate along the exhaust duct.

12. The system of claim 1, wherein
the exhaust duct comprises an upstream section and a downstream section;
the upstream section is upstream of the bypass flow regulator and has a first cross-sectional geometry; and
the downstream section is at the bypass flow regulator and has a second cross-sectional geometry that is different than the first cross-sectional geometry.

13. The system of claim 12, wherein
the first cross-sectional geometry has a circular shape; and
the second cross-sectional geometry has an elongated shape.

14. A system for an aircraft, comprising:
an exhaust duct extending longitudinally to an exhaust nozzle, an upstream section of the exhaust duct having a first cross-sectional geometry with a first shape, a downstream section of the exhaust duct having a second cross-sectional geometry with a second shape different than the first shape, the downstream section of the exhaust duct located between the upstream section of the exhaust duct and the exhaust nozzle, and the exhaust nozzle configured to direct fluid out of the exhaust duct along an exhaust trajectory with an aft directional component;
a nozzle bypass duct projecting out from a side of the downstream section of the exhaust duct to a bypass duct outlet, the bypass duct outlet configured to direct fluid out of the nozzle bypass duct along a bypass trajectory with an aft directional component, and the bypass trajectory with the aft directional component projecting out from the bypass duct outlet and away from the nozzle bypass duct in a direction comprising the aft directional component; and
a bypass flow regulator configured to regulate fluid flow from the exhaust duct into the nozzle bypass duct;

wherein a portion of a sidewall of the exhaust duct is laterally opposite and longitudinally overlaps an inlet into the nozzle bypass duct at the side of the downstream section of the exhaust duct.

15. The system of claim 14, further comprising an exhaust flow regulator configured to regulate fluid flow within the downstream section of the exhaust duct to the exhaust nozzle.

\* \* \* \* \*